(12) United States Patent
Cho et al.

(10) Patent No.: US 12,549,970 B2
(45) Date of Patent: Feb. 10, 2026

(54) SYSTEM AND METHOD FOR IDENTIFYING SPATIAL RESOURCE FOR IOT NETWORK BASED ON MACHINE LEARNING

(71) Applicant: CHUNG ANG University Industry Academic Cooperation Foundation, Seoul (KR)

(72) Inventors: Sung Rae Cho, Seongnam-si (KR); Woong Soo Na, Suwon-si (KR); Dong Hyun Lee, Seoul (KR); Jun Suk Oh, Seoul (KR)

(73) Assignee: CHUNG ANG University Industry Academic Cooperation Foundation, Seoul (KR)

( * ) Notice: Subject to any disclaimer, the term of this patent is extended or adjusted under 35 U.S.C. 154(b) by 302 days.

(21) Appl. No.: 18/518,817

(22) Filed: Nov. 24, 2023

(65) Prior Publication Data
US 2024/0196232 A1    Jun. 13, 2024

(30) Foreign Application Priority Data

Dec. 8, 2022  (KR) .................. 10-2022-0170766

(51) Int. Cl.
*H04W 24/02*  (2009.01)
*H04B 7/06*  (2006.01)
*H04B 17/336*  (2015.01)

(52) U.S. Cl.
CPC ........ *H04W 24/02* (2013.01); *H04B 7/06952* (2023.05); *H04B 17/336* (2015.01)

(58) Field of Classification Search
CPC .. H04B 17/336; H04B 7/06952; H04W 24/02
See application file for complete search history.

(56) References Cited

U.S. PATENT DOCUMENTS

| | | | |
|---|---|---|---|
| 2016/0309476 A1* | 10/2016 | Madan | H04W 28/0236 |
| 2017/0238346 A1* | 8/2017 | Egner | A61B 5/14503 |
| | | | 370/338 |
| 2020/0236660 A1* | 7/2020 | Kalhan | H04W 72/23 |
| 2022/0174512 A1* | 6/2022 | Rune | H04W 24/02 |

OTHER PUBLICATIONS

L. Kayili Ph.D., "Office Action for Canadian Application No. 3,221,006", Dec. 30, 2024, CIPO, Canada.
M. K. Afzal et al., "Unlocking 5G spectrum potential for intelligent IoT: Opportunities, challenges, and solutions," IEEE Commun. Mag., vol. 56, No. 10, pp. 92-93, Oct. 2018.
A. Osseiran et al., "Scenarios for 5G mobile and wireless communications: The vision of the METIS project," IEEE Commun. Mag., vol. 52, No. 5, pp. 26-35, May 2014.

\* cited by examiner

*Primary Examiner* — Zhubing Ren
(74) *Attorney, Agent, or Firm* — Bridgeway IP Law Group, PLLC; Jihun Kim

(57) ABSTRACT

Disclosed is a system for identifying a spatial resource for an IoT network, the system including a plurality of IoTDs (IoT devices) configured to identify an empty spatial resource using an identification parameter and provide spectrum identification information corresponding to a result thereof, and a radio resource harvesting edge (RRHE) configured to receive the spectrum identification information, optimize the identification parameter based on the received spectrum identification information, and provide the optimized identification parameter to the IoTDs.

11 Claims, 6 Drawing Sheets

SYSTEM AND METHOD FOR IDENTIFYING SPATIAL RESOURCE FOR IOT NETWORK BASED ON MACHINE LEARNING

CROSS REFERENCE TO RELATED APPLICATION

The present application claims priority to Korean Patent Applications No. 10-2022-0170766, filed Dec. 8, 2022, the entire contents of which are incorporated herein for all purposes by this reference.

BACKGROUND

Technical Field

The present invention relates to a system and method for identifying a spatial resource for an IoT network based on machine learning.

Description of the Related Art

The proliferation of Internet of Things (IoT) devices (IoTDs) has resulted in the exponential growth of wireless data traffic in IoTs networks. Existing wireless access methods that employ macro base stations (MBSs) are incapable of accommodating such gargantuan data demands due to the poor quality of signals received by IoTDs located indoors or at cell boundaries. As a result, the deployment of femto base stations (FBSs) is considered a viable solution for providing IoTDs with better signal quality.

In this architecture, the microcells offload data through femtocell networks to the IoTDs. This architecture may facilitate efficient spectrum sharing between IoTDs. In addition, the FBS, which has low deployment cost and flexible configuration ability, may achieve more efficient spectrum sharing by using the spectral information collected from the surrounding IoTDs.

FIG. 1 is a diagram illustrating an example of a conventional IoT network model. As shown in FIG. 1, an FBS (or edge server) is deployed in a network topology, and the IoTDs transmit/receive data to/from the FBSs over licensed bands. However, certain spatial frequency resources remain unused by the IoTDs, which results in spectrum inefficiency. Identification of these unused spatial frequency resources may improve the spectrum efficiency, and the IoTDs may utilize these spatial frequency resources for infrastructure-less device-to-device (D2D) communication.

The matters described as the background art above are only for improving understanding of the background of the present invention, and should not be taken as an admission that the matters correspond to the conventional art previously known to those skilled in the art.

(Non-Patent Document 1) M. K. Afzal, Y. B. Zikria, S. Mumtaz, A. Rayes, A. Al-Dulaimi, and M. Guizani, "Unlocking 5G spectrum potential for intelligent IoT: Opportunities, challenges, and solutions," IEEE Commun. Mag., vol. 56, no. 10, pp. 92-93, October 2018

(Non-Patent Document 2) A. Osseiran et al., "Scenarios for 5G mobile and wireless communications: The vision of the METIS project," IEEE Commun. Mag., vol. 52, no. 5, pp. 26-35, May 2014.

SUMMARY

Accordingly, a technical problem of the present invention is to provide a system and method for identifying a spatial resource for an IoT network based on machine learning capable of identifying communication resources allowing D2D communication to improve spectrum efficiency.

The problem to be solved by the present invention is not limited to content described above, and other problems and advantages of the present invention that are not mentioned may be understood by the following description, and more clearly by the embodiments of the present invention. In addition, those skilled in the art to which the present invention pertains will readily recognize that the problems and advantages of the present invention may be realized by the means and combinations indicated in the claims.

In accordance with an aspect of the present invention, the above and other objects can be accomplished by the provision of a system for identifying a spatial resource for an Internet of Things (IoT) network, the system including
a plurality of IoTDs (IoT devices) configured to identify an empty spatial resource using an identification parameter and provide spectrum identification information corresponding to a result thereof, and
a radio resource harvesting edge (RRHE) configured to receive the spectrum identification information, optimize the identification parameter based on the received spectrum identification information, and provide the optimized identification parameter to the IoTDs.

Each of the IoTDs may perform device-to-device (D2D) communication with another IoTD using the empty spatial resource.

Each of the IoTDs may detect surrounding IoTDs using an energy detection method based on a signal-to-noise ratio (SNR) of a received signal.

The RRHE may be a learning agent configured to perform a reinforcement learning (RL) algorithm to optimize the identification parameter.

A state of the RL algorithm may be a beam set including beams of the IoTDs, and an action of the RL algorithm may be a subset of the beam set including selected beams among the beams of the IoTDs.

A reward of the RL algorithm may be defined as a probability of finding a spectrum resource for energy consumed in identifying the IoTDs.

The RRHE may apply an ϵ-greedy algorithm for an action of the RL algorithm.

The RRHE may collect the spectrum identification information from the IoTDs, perform the RL algorithm to calculate a reward for determination of an optimal beam set, share an identification parameter derived based on previously collected spectrum identification information and a previously derived identification parameter with the IoTDs, and retrain and find an optimal identification parameter based on a result reported from the IoTDs.

In accordance with another aspect of the present invention, there is provided a method of identifying a spatial resource for an IoT network, the method including
an identification phase of finding, by each of a plurality of IoTDs, an unused spatial resource using an identification parameter provided by an RRHE, and finding, by the RRHE, the optimal identification parameter through RL,
a report phase of sending, by the plurality of IoTDs, an identification result to the RRHE through a control channel, and receiving, by the RRHE, the identification result and sending the identification parameter found through previous RL in the identification phase to the IoTDs, and
a communication phase of performing, by the plurality of IoTDs, D2D communication through surrounding unused spectrum resources, updating, by the RRHE, the identification result received in the report phase, and starting, by the RRHE, to find an identification parameter using RL.

BRIEF DESCRIPTION OF THE DRAWINGS

The following drawings attached to this specification illustrate preferred embodiments of the present invention, and serve to facilitate understanding of the technical idea of the present invention together with the detailed description of the present invention, and thus the present invention should not be construed as being limited to the matters described in the following drawings, in which.

DETAILED DESCRIPTION

Specific structural or functional descriptions of the embodiments described below are disclosed for illustrative purposes only, and may be modified and implemented in various forms. Therefore, the embodiments are not limited to the specific disclosed form, and the scope of the present specification includes changes, equivalents, or substitutes included in the technical spirit.

Even though terms such as "first", "second", etc. may be used to describe various elements, such terms should only be construed for the purpose of distinguishing one element from another. For example, a first element may be referred to as a second element, and similarly, the second element may be referred to as the first element.

When an element is referred to as being "coupled" to another element, the element may be directly coupled or connected to the other element. However, it should be understood that another element may be present therebetween.

The singular expression includes the plural expression unless the context clearly dictates otherwise. In the present specification, it should be understood that a term such as "include" or "have" is intended to designate that the features, numbers, steps, operations, elements, parts, or combinations thereof described here are present, and does not preclude the possibility of addition or presence of one or more other features, numbers, steps, operations, elements, parts, or combinations thereof.

Unless defined otherwise, all terms used herein, including technical or scientific terms, have the same meanings as commonly understood by those ordinary skilled in the art. Terms such as those defined in commonly used dictionaries should be interpreted as having meanings consistent with the meanings in the context of the related art, and should not be interpreted as having ideal or excessively formal meanings unless explicitly defined in this specification.

First, each element of a spatial resource identification system according to an embodiment of the present invention and basic concepts applied thereto will be described in detail.

Figure 2:
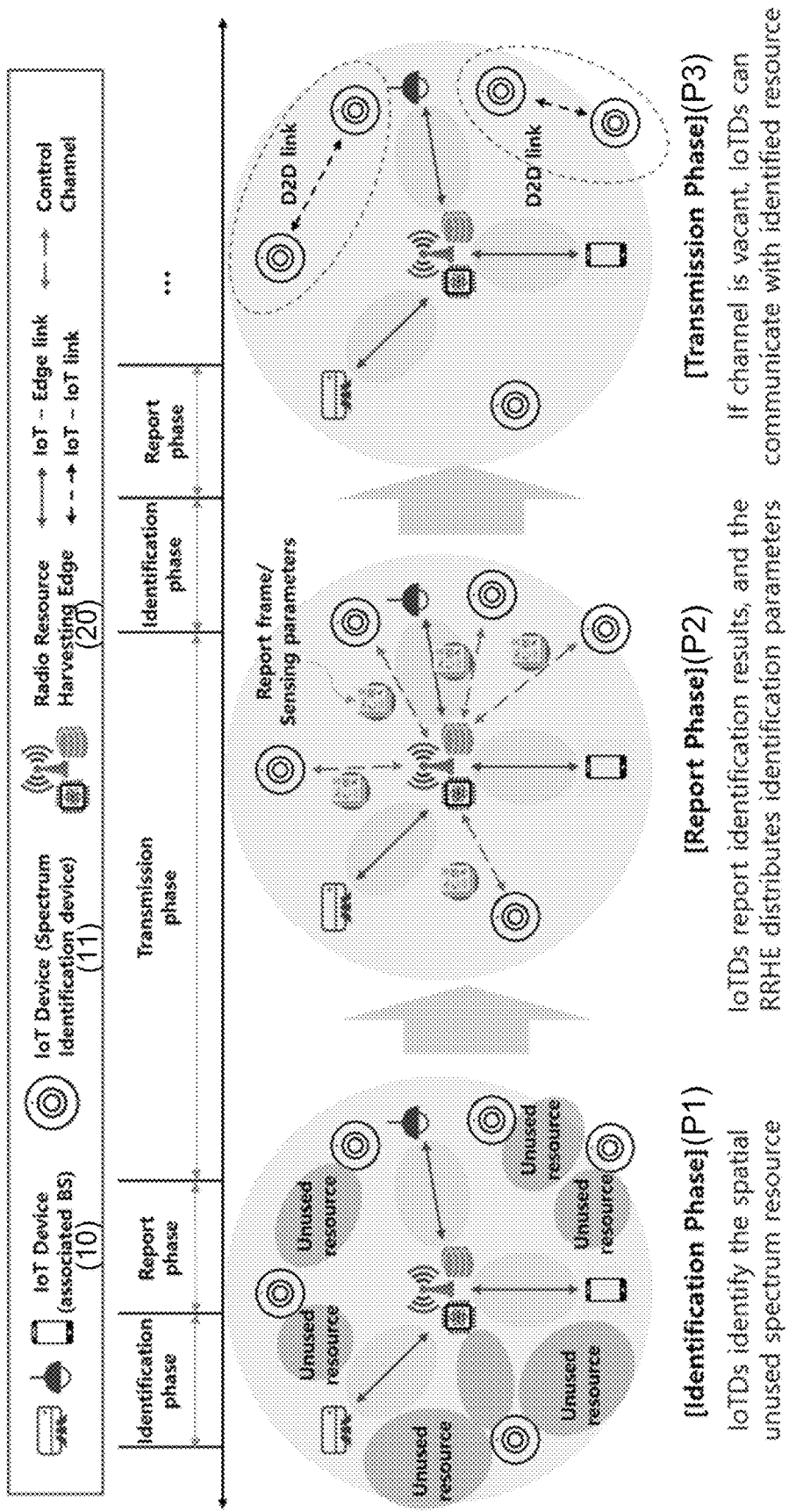
FIG. 2 is a diagram for describing a network model to which a spatial resource identification system according to an embodiment of the present invention is applied and an operation thereof.

FIG. 2 is a diagram for describing a network model to which the spatial resource identification system according to the embodiment of the present invention is applied and an operation thereof.

As illustrated in FIG. 2, the network model to which the spatial resource identification system according to the embodiment of the present invention is applied may include an IoTD 11 and an RRHE 20. In addition, in the spatial resource identification system according to the embodiment of the present invention, the IoTD may operate in three phases of an identification phase S1, a report phase S2, and a transmission phase S3. In each phase, the IoTD 11 may perform the following actions. In FIG. 2, reference numeral "10" refers to the IoTD communicating with a base station, and the embodiment of the present invention relates to a spatial resource identification technique enabling D2D communication between IoTs. Therefore, in the description of the embodiment of the present invention, the IoTD may be understood as an IoTD referred to as "11" that undergoes a spectrum identification process.

1) Identification phase (S1): Each IoTD may detect signals within a sensing range of the IoTD based on an energy-detection scheme and identify empty spatial resources. An identification scheme applied in the embodiment of the present invention may use optimized identification parameters and store a location of the detected IoTD in a local connectivity matrix.

2) Report phase (S2): Each IoTD may send a local connectivity matrix containing location information of the IoTD detected during the identification period S1 to the RRHE. A report frame may be delivered via an underlying control channel or may be forwarded in a multihop manner via wireless backhaul routing. The RRHE may identify optimal identification parameters based on the received information and deliver this information to each IoTD in the next report phase.

3) Transmission phase (S3): During this phase S3, an IoTD may communicate by utilizing unused spatial-frequency resources.

Figure 1:
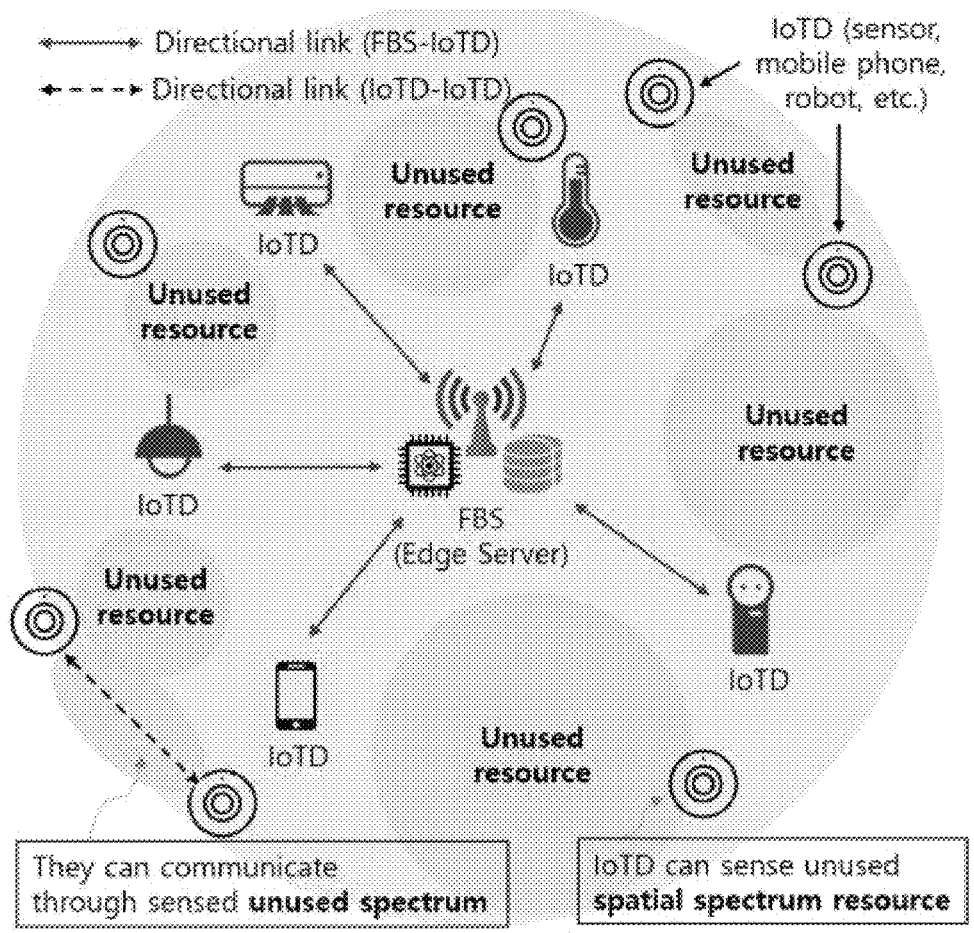
FIG. 1 is a diagram illustrating an example of a conventional IoT network model.

FIG. 1 illustrates a timeline applied to an embodiment of the present invention. In the embodiment of the present invention, each IoTD may identify an unused spectrum resource with identification parameters in each identification phase S1. After the identification phase S1, each IoTD may transmit a report frame containing identification results to the RRHE and receive a command frame from the RRHE. After receiving the command frame, each IoTD may block beams mentioned in the received command frame. In the transmission phase S3, the IoTDs transmit/receive data frames to/from other IoTDs using unblocked beams. In this phase S3, the IoTDs may operate in a contention-based manner. More detailed associated communication techniques will be discussed below.

IoTDs performing D2D communication are equipped with directional antennas, and may communicate directionally. Directional antennas in the mmWave band may be classified as 1) switched-beam antennas and 2) beam-steering antennas. Switched-beam antennas are designed to cover a certain area per fixed beam, and one beam may be activated to perform communication. In beam-steering antennas, a main beam is controlled by phase shifters in a desired direction to transmit and receive information.

The switched-beam antennas have an advantage of convenient implementation and low cost, and have a disadvantage of attenuating the signal strength during switching between beams. The beam-steering antennas have an advantage of high signal quality realized through sophisticated control. However, implementation thereof is expensive and complex. It may be assumed that the switched-beam antennas are used in the embodiment of the present invention since IoTD systems tend to have limited available energy and computing power. In addition, it may be assumed that a radio Internet device including the RRHE is equipped with a switched-beam array antenna having M beam patterns, and each beam pattern is ideally nonoverlapped. During transmission, only one direction of each sector is activated to transmit the signals, and the other sectors may be blocked. During reception, multiple sectors may be activated simultaneously, or only a specific direction may be activated. An antenna controller may be assumed to be used to keep track of a direction from which the maximum signal power is received.

The RRHE is an element that collects identification results from the IoTDs. Based on the identification results, the RRHE may determine optimal identification parameters of each IoTD. Furthermore, the RRHE may send identified spatial frequency information to the IoTDs for D2D communication. The RRHE may include any form or combination of an MBS, FBS, Wi-Fi access point (AP), or any dedicated RRHE. Even when the FBS/MBS is aware of frequency information in a cell area, the FBS/MBS cannot know local information of the IoTDs. Therefore, the RRHE may maximize frequency resource efficiency by allocating spatial-frequency resources to the IoTDs based on local identification information.

The IoTD may use C data channels and a non-orthogonal multiple access (NOMA)-based wireless network. The NOMA scheme is implemented by combining orthogonal-frequency division multiplexing access and multicarrier code division multiple access. As known in this scheme, a single physical data channel having S subcarriers is assumed in the embodiment of the present invention. The data channel may be divided into two subcarrier groups (SCGs) as follows.

1) SCG 1 ($S_1$): The minimum number of subcarriers for data transmission. These subcarriers occupy only a small portion of the bandwidth of the data channel.
2) SCG 2 ($S_2$): The set of remaining subcarriers excluding $S_1$ in the data channel.

In the embodiment of the present invention, a full subcarrier may be allocated for each beam of IoTD i. $C^i_j$ denotes a data channel of a jth beam direction of IoTD i. $C^i_j$ may be interpreted as a geographical transmission and reception coverage area of IoTD i when a jth beam is exploited. Furthermore, $S^i_{1,j}$ and $S^i_{2,j}$ denote SCG 1 and SCG 2 for the jth beam of IoTD i, respectively. In the embodiment of the present invention, the system may be designed to have a wider spectrum for $S_2$ than for $S_1$, and $S_1$ and $S_2$ may be assumed to be sufficiently separated to negate any interference between therebetween.

Further, in the embodiment of the present invention, it is possible to assume an underlying control channel that utilizes all $S_1$ of the C channels. Implementation of an underlying control channel for a cognitive radio network (CRN) has been validated. Each IoTD may report identification results (presence/absence and position of the IoTD) to the RRHE via the control channel. Similarly, the RRHE may calculate the optimal identification parameters for each IoTD by utilizing the reported information and disseminate the identification parameters to all the IoTDs via the control channel.

Several classical spectrum identification techniques have been proposed, including matched filters, feature detection, and energy detection. In the embodiment of the present invention, the IoTDs may utilize an energy-detection technique to determine the presence or absence of an IoTD based on the amount of energy received. Received signals may be integrated every observation interval. Finally, the output of the integrator divided by the noise power [that is, the signal-to-noise ratio (SNR)] may be compared with a certain threshold (or detection sensitivity of the radio Internet device) to determine the presence of the radio Internet device. An IoTD may be determined to be present in the identified channel when the SNR is greater than the IoTD-detection sensitivity.

Hereinafter, a detailed description will be given of main operations of the spatial resource identification system according to an embodiment of the present invention.

Directional Spectrum Identification/Harvesting

In a cooperative directional identification/harvesting scheme, the IoTDs share the identification area with each other, which prevents the detection of overlapping areas. Furthermore, the RRHE may form multiple clusters. Each IoTD may identify a specific assigned direction using identification beams. These identification beams for the IoTDs are assigned by the RRHE, which may attempt to maximize the detection probability of the IoTD while reducing the overall identification overhead.

To improve the detection probability, the IoTDs may use as many beams as possible for identification. However, this approach results in various side effects such as significant energy consumption by the IoTDs in addition to time and network resources consumed for the identification. The following are the main overhead issues caused by the identification process.

1) Energy overhead caused by identification: An IoTD that is performing identification consumes additional energy.
2) Energy overhead caused by reporting: An IoTD that is transmitting an identification result to the RRHE consumes energy to transmit the report frames.

Therefore, the optimization technique should identify the identification parameters that may detect the IoTD and reduce the identification overhead simultaneously.

Identification Parameter Optimization

In the embodiment of the present invention, to maximize the efficiency of the spectrum identification process, the set of beams ($B_i$) may be optimized to identify the IoTDs using an objective function. $B_i$ may be expressed as $B_i=[b_i^0, b_i^1, b_i^3, \ldots, b_i^{M-1}]^T$, where $b_i^j$ is 1 when the jth beam of the IoTD is used for identification, and $b_i^j$ is 0, otherwise. Here, the objective function may be written as the following Equation 1.

$$\min_B \alpha(1 - P(B)) + (1 - \alpha)O(B) \qquad \text{[Equation 1]}$$

Here, P(B) and O(B) denote an IoTD detection probability and identification overhead in terms of B, respectively, and a denotes a weight factor. Furthermore, B denotes the set of beams for all IoTDs i. Here, the IoTD detection probability P may be modeled as the following Equation 2.

$$P(B) = P(\text{at least one } IoTD \text{ detect any other } IoTD) \quad \text{[Equation 2]}$$
$$= 1 - P(N \text{ nodes cannot find any other } IoTD)$$
$$= 1 - \prod_{i=0}^{N-1}\{1 - P_i(B_i)\}$$

Here, N denotes the number of IoTDs, and $P_i(B_i)$ denotes an ith IoTD detection probability in terms of the identified beams. Then, $P_i(B_i)$ may be given as the following Equation 3.

$$P_i(B_i) = \frac{\text{Number of beams to sense}}{\text{Number of entire beams}} = \frac{\sum_{j=0}^{M-1} b_i^j}{M} \quad \text{[Equation 3]}$$

In the past, the identification overhead has been modeled in terms of the time overhead for identification. However, herein, in the embodiment of the present invention, the identification overhead O may be modeled based on energy consumed for identification. The identification overhead O may be defined as the following Equation 4.

$$O(B) = \sum_{z \in \{s,r\}} O_z(B) \quad \text{[Equation 4]}$$

Here, $O_s(B)$ denotes the overhead due to spectrum identification. $O_r(B)$ denotes the overhead due to transmission of the identification results and reception of the identification parameters from the RRHE. The radio Internet device consumes energy while identifying a channel. When ρ denotes energy consumption per unit time, $O_s(B)$ may be expressed as the following Equation 5.

$$O_s(B) = \sum_{i=0}^{N-1} |B_i| * t_s * \rho \quad \text{[Equation 5]}$$

Here, $t_s$ and $|B_i|$ denote the identification time and number of selected beams for spectrum identification, respectively.

Similarly, IoTDs consume energy while transmitting identification results and receiving the identification parameters. Hence, the report overhead $O_r(B)$ may be determined as the following Equation 6.

$$O_r(B) = \sum_{i=0}^{N-1} |B_i| * L_r * \rho \quad \text{[Equation 6]}$$

Here, $L_r$ denotes the length of the report phase.

In previous work, the identification beams having the highest SNR values have been used to improve the identification accuracy and minimize the overlapped identification area to reduce overhead. However, in the previous scheme, a beam having a good channel condition has always been selected, resulting in an energy-consumption inequality between the IoTDs. Furthermore, since the identification overhead has been modeled as a wasted time opportunity, energy consumed for identification has been relatively high. To address this problem, a beam selection algorithm based on machine learning techniques is proposed.

Optimal Beam Selection Based on RL

A standard RL model includes a finite set of possible states of an environment $S=\{s_1, s_2, \ldots, s_n\}$, a set of possible actions $A=\{a_1, a_2, \ldots, a_m\}$ of a learning agent, a scalar reinforcement signal r, and an agent policy π. At each time step, the agent perceives the state s∈ S of the environment and selects an action a∈ A based on the current policy π. Time is represented by a sequence of time steps t=0, 1, . . . . At each time step, a controller observes the current state of the system and selects an action. Correspondingly, the environment transitions to the new state s'∈ S and generates a reinforcement signal $c_t$, which is referred to as an immediate reward. The new state and the reinforcement signal are provided to a learning agent, and the learning agent updates the policy, and the next round of iteration begins.

The objective of the learning agent is to find an optimal policy π*(s) for each state that minimizes the total expected discounted reward over an infinite time horizon. This reward may be defined as the following Equation 7.

$$V^*(s) = \min_\pi \mathbb{E}\left(\sum_{t=0}^{(\infty)} \gamma^t c_t\right) \quad \text{[Equation 7]}$$

Here, E represents the expectation of the operator, and γ∈ (0,1) is a discount factor. An RL algorithm is considered to converge when the learning curve becomes flat and no longer increases. Q-Learning has been proven to converge toward the optimal solution. Thus, the optimality condition may be defined as the following Equation 8.

$$V(s)^{(t+1)} - V(s)^{(t)} < e6 \approx 0 \quad \text{[Equation 8]}$$

Here, t denotes an iteration step and e denotes a small size threshold. As per Bellman's optimality criterion, the optimal policy n satisfies the following Equation 9.

$$V^*(s) = \min_a \left( C(s, a) + \gamma \sum_{s' \in S} P_{s,s'}(a) V^*(s') \right) \quad \text{[Equation 9]}$$

Here, C(s, a) denotes an expected cost C(s, a)=E{c(s, a)}, and $P_{s,s'}$ denotes a transition probability for the change from s to s'. When an optimal value function is given, the optimal policy may be specified as the following Equation 10.

$$\pi^*(s) = \arg\min_a \left( C(s, a) + \gamma \sum_{s' \in S} P_{s,s'}(a) V^*(s') \right) \quad \text{[Equation 10]}$$

For each learning agent i, an evaluation function, denoted by Q(s, a), may be defined as the expected discounted reinforcement of taking action "a" in the state s and then counting by optimally selected action as the following Equation 11.

$$Q(s, a) = \mathbb{E}\left\{\sum_{t=0}^{\infty} \gamma^t c(s_t, \pi(s)) | s_0 = s\right\} \quad \text{[Equation 11]}$$

For each learning agent i, Q(s, a) may be rewritten as the following Equation 12.

$$Q(s, a) = C(s, a) + \gamma \sum_{s' \in S} P_{s,s'}(a) Q(s', a') \qquad \text{[Equation 12]}$$

To apply Bellman's criterion, an intermediate minimal value of Q(s, a), denoted as Q*(s, a) needs to be found. Here, an intermediate evaluation function for every possible subsequent state-action pair is minimized, and the optimal action is performed with respect to each subsequent state. Q*(s, a) is given as the following Equation 13.

$$Q^*(s, a) = C(s, a) + \gamma \sum_{s' \in S} P_{s,s'}(a) \min_{a' \in A} Q^*(s', a') \qquad \text{[Equation 13]}$$

An action a* with respect to the current state s may be determined. In other words, d* may be determined. Therefore, Q*(s, a*) is minimal and may be expressed as the following Equation 14.

$$Q^*(s, a^*) = \min_{a \in A} Q^*(s, a) \qquad \text{[Equation 14]}$$

In the Q-learning process, attempts may be made to find Q(s, a) in a recursive manner by utilizing the available information (s, a, s', a'), where s and s' are the states at times t and t+1, respectively, and a and a' are the actions taken at times t and t+1, respectively. The Q-learning rule for updating the Q-values relative to learning agent i is given as the following Equation 15.

$$Q(s, a) = Q(s, a) + \alpha \left[ c + \gamma \min_a Q(s', a') - Q(s, a) \right] \qquad \text{[Equation 15]}$$

Here, α (alpha) denotes a learning rate.

In the embodiment of the present invention, an attempt may be made to find an optimal beam set for all the IoTDs in different environment states such that the objective function is minimized. Reasons for applying RL for selection of an optimal beam set are as follows.

1) The advantage of RL is that, over time, reward-based learning results in increasing number of optimal results. In the network environment, it is assumed the IoTDs are distributed, and opportunistically detect unused spectrum resources for D2D communication. Therefore, fixed IoTDs may detect a great number of unused spectra at a lower cost over time.

2) There may be frequent network topology changes. The status of the IoTDs changes from time to time. In some cases, the battery wears out, thus causing the IoTD to power down or a new IoTD to participate. Therefore, in a topology where the network conditions change frequently, RL techniques that yield the optimum result with relatively few computations may be suitable.

In the embodiment of the present invention, the RRHE may be the learning agent, and the IoTDs and an identification beam set of the IoTDs may be an environment of the learning agent. Correspondingly, in the embodiment of the present invention, basic RL elements may be defined as follows.

1) State: Selection of a state space is a basic step of Q-learning. The selected state variables need to include features that are knowable and have no aftereffects. In the embodiment of the present invention, the state is defined as a set of beams utilized by each IoTD for identification. When it is assumed that a total of $2^M$ beam combinations is utilized, the number of states for each IoTD is $2^M$, and a state $s_i$ of IoTD i is defined as the following Equation 16.

$$s_i = \{b_i^0, b_i^1, b_i^2, \ldots, b_i^{M-1}\} \forall i \qquad \text{[Equation 16]}$$

Here, $b_i^j$ is 1 when the jth beam of IoTD i is utilized for identification. Otherwise, $b_i^j$ is zero.

2) Action: A set of possible actions may be determined based on the selected beams for each IoTD. The action $a_i$ of IoTD i may be defined as a subset of the state $s_i$ as the following Equation 17.

$$a_i = \{\overline{b}_i^0, \overline{b}_i^1, \overline{b}_i^2, \ldots, \overline{b}_i^{S-1}\} \subset s_i \forall i \qquad \text{[Equation 17]}$$

Here, $$\overline{b}_i^j$$

denotes a member of the selected beam set and, and S denotes the number of selected beams.

3) Reward: In the embodiment of the present invention, in RL-based Q-learning, each state is defined as a set of beams utilized by each IoTD for identification, and the action is defined as a beam set to be activated for identification of all the nodes. When determining new beam sets for all the IoTDs, the overall network reward is defined as a probability of finding spectrum resources against energy consumed for identification. In other words, a reward function C(s, a) may be designed with the objective function (1). Therefore, the reward function C(s, a) may be defined as the following Equation 18.

$$C(s,a) = \alpha(1 - P(B)) + (1 - \alpha)O(B) \qquad \text{[Equation 18]}$$

In an identification algorithm according to the embodiment of the present invention, the RRHE determines identification parameters of all the IoTDs. Since each IoTD has a different channel environment, location, etc., the RRHE needs to learn about all of the IoTDs individually. Algorithm 1 below describes a Q-learning-based beam set $B_i$ selection algorithm for spectrum identification.

[Algorithm 1]
Algorithm 1: Q-Learning Algorithm for $B_i$ Selection.

1: Initialize:
2:   Initialize Q (s, a) with random weights;
3:   Evaluate the starting state $s_t^i$:
4:
5: Learning:
6: loop
7:   Generate a random number r, 0 ≤ r ≤ 1;
8:   if r < ϵ then
9:     Select an action randomly;
10:   else

[Algorithm 1]
Algorithm 1: Q-Learning Algorithm for $B_i$ Selection.

11:   Select the action a characterized by the minimum
      Q value;
12:   end if
13:   Evaluate an immediate cost $c_t^i$ base on (18);
14:   Observe the next state $s_{t+1}^i$;
15:   Q(s, a) = Q (s, a)+α[c+γminQ(s,' a')-Q(s, a)];
16:   $s_t^i \leftarrow s_{t+1}^i$;
17:   end loop For beam selection (action) by each IoTD, the RRHE may utilize an ϵ-greedy algorithm, where ϵ is a random factor used to find optimal values to avoid the local minima.

The RRHE may work as follows based on the RL technique according to the embodiment of the present invention.
1) The RRHE collects IoTDs spectrum identification information in the report phase.
2) The RRHE performs the RL algorithm until the next report phase and calculates the reward for determining the optimal beam set.
3) The RRHE shares the derived identification parameters with the IoTDs based on previously obtained values in the next report phase (previously reported spectrum identification information and previously derived identification parameters, etc.), and retrains and finds the optimal values based on the reported results.

In the embodiment of the present invention, the RRHE may include a learning agent that needs to manage the identification parameters of all the IoTDs. Therefore, the algorithm complexity depends on the number of IoTDs and the number of antennas. In the embodiment of the present invention, complexity of the algorithm may be analyzed to find the optimal identification beam set based on RL. In the embodiment of the present invention, each IoT may have a total of $2^M$ states, and $2^M$ candidate actions may be present. Therefore, the algorithm for finding the optimal beam set based on the proposed RL may have worst-case time complexity of $O(N \cdot 2^M)$, assuming a total of N IoTDs. In the algorithm for finding the optimal beam set, the RRHE may find the optimal beam sets for all the IoTDs based on RL and inform each IoTD of the optimal beam set in the next report phase. Therefore, calculation needs to be completed within the interval of the report phase.

A description will be given of an example in which the RRHE is implemented using the Raspberry Pi 4B as a representative IoTD. In this example, a CPU generates clock signals at about 1.5 GHz. When it is assumed that about 100 clock cycles are consumed to calculate the reward, about $1.5 \times 10^7$ operations may be performed. When M=16 (the number of antennas of the IoTD=16) and the identification cycle is 1 s, it is possible to find the optimal identification beams for 228 IoTDs ($228 \times 2^{16} \approx 1.5 \times 10^7$). Thus, by assuming that the identification period is $T_s$, it is possible to find the identification beams for $228 \times T_s$ IoTDs.

To evaluate applicability of the above-described RL-spatial resource identification technique, the inventors of the present invention built a simple IoT system and measured a computational time. In this system, the Raspberry Pi 3 model plays the role of the RRHE, and RL is used to find the optimal beam of the surrounding 200 IoTDs.

Figure 3:
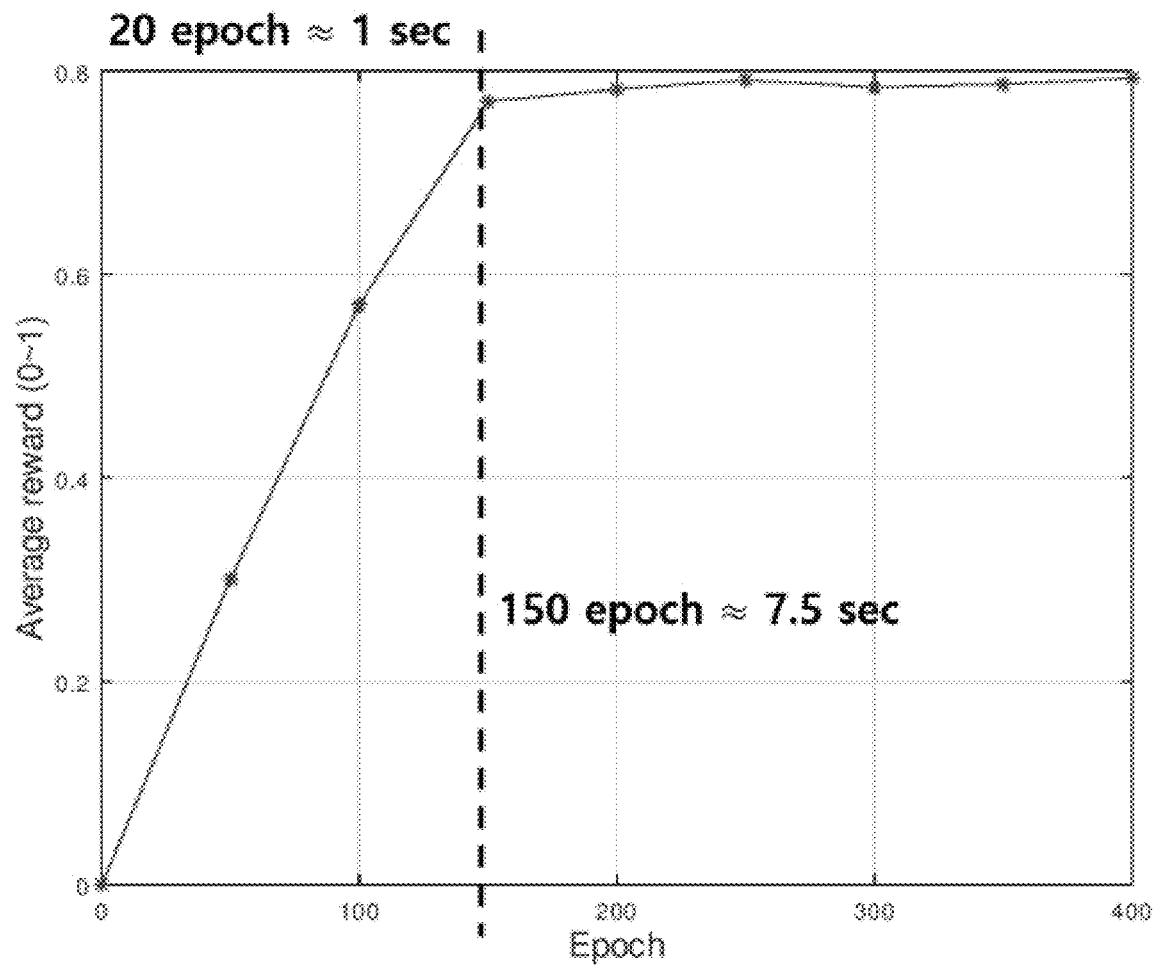
FIG. 3 is a graph illustrating an experimental result for evaluating applicability of a reinforcement learning (RL)-based spatial resource identification system according to the embodiment of the present invention.

FIG. 3 is a graph illustrating an experimental result for evaluating applicability of the RL-based spatial resource identification system according to the embodiment of the present invention.

As illustrated in FIG. 3, in the experimental result, the reward converges at between approximately 150 and 200 epochs. Since 20 epochs consume approximately 1 s, it was analyzed that approximately 7.5 s would be required in the actual experimental environment. Therefore, optimization needs to be completed within 7.5 s to ensure accurate sensing results on this system. That is, the sum of the identification period (Ts) and communication period (Tc) needs to be longer than 7.5 s.

Workflow of RL-Based Identification Scheme

Figure 4:
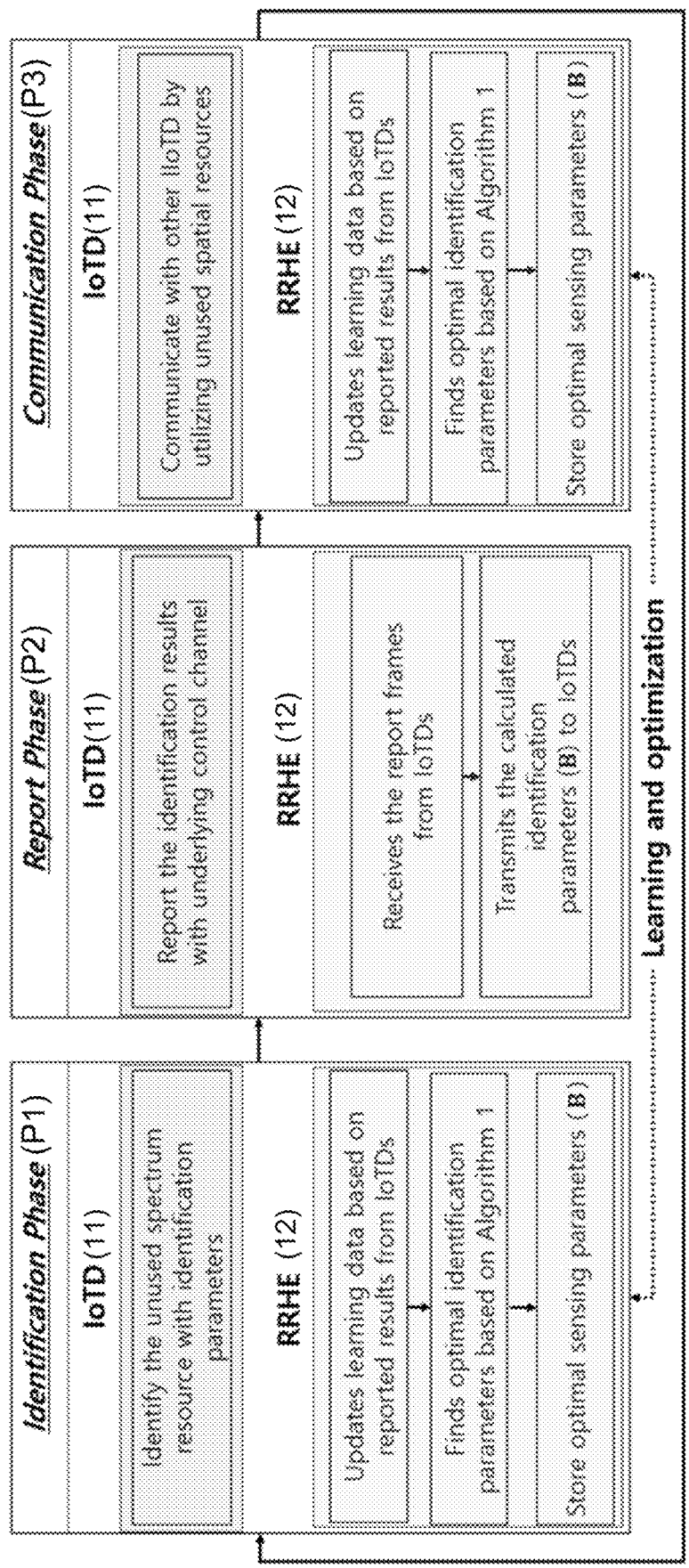
FIG. 4 is a diagram illustrating a workflow of the RL-based identification system according to the embodiment of the present invention.

FIG. 4 is a diagram illustrating a workflow of the RL-based identification system according to the embodiment of the present invention. As illustrated in FIG. 4 and described above, the spatial resource identification technique according to the embodiment of the present invention may include three phases P1, P2, and P3.

In the identification phase P1, each IoTD may find unused spatial resources using the identification parameters selected from the RRHE. Simultaneously, the RRHE may find the optimal identification parameters through RL.

In the report phase P2, each IoTD may send the identification results to the RRHE through the control channel. The RRHE may receive the identification results and send the identification parameters found in the RL in the previous phase to the IoTD.

In the communication phase P3, each IoTD performs D2D communication through the surrounding unused spectrum resources, and the RRHE updates new data (identification results) and starts identifying the identification parameters using RL. The RRHE may perform the same operation as that in the identification phase P1. Phases performed by the RRHE in the communication phase P3 and the identification phase P1 may be referred to as a learning and optimization phase.

Figure 5:
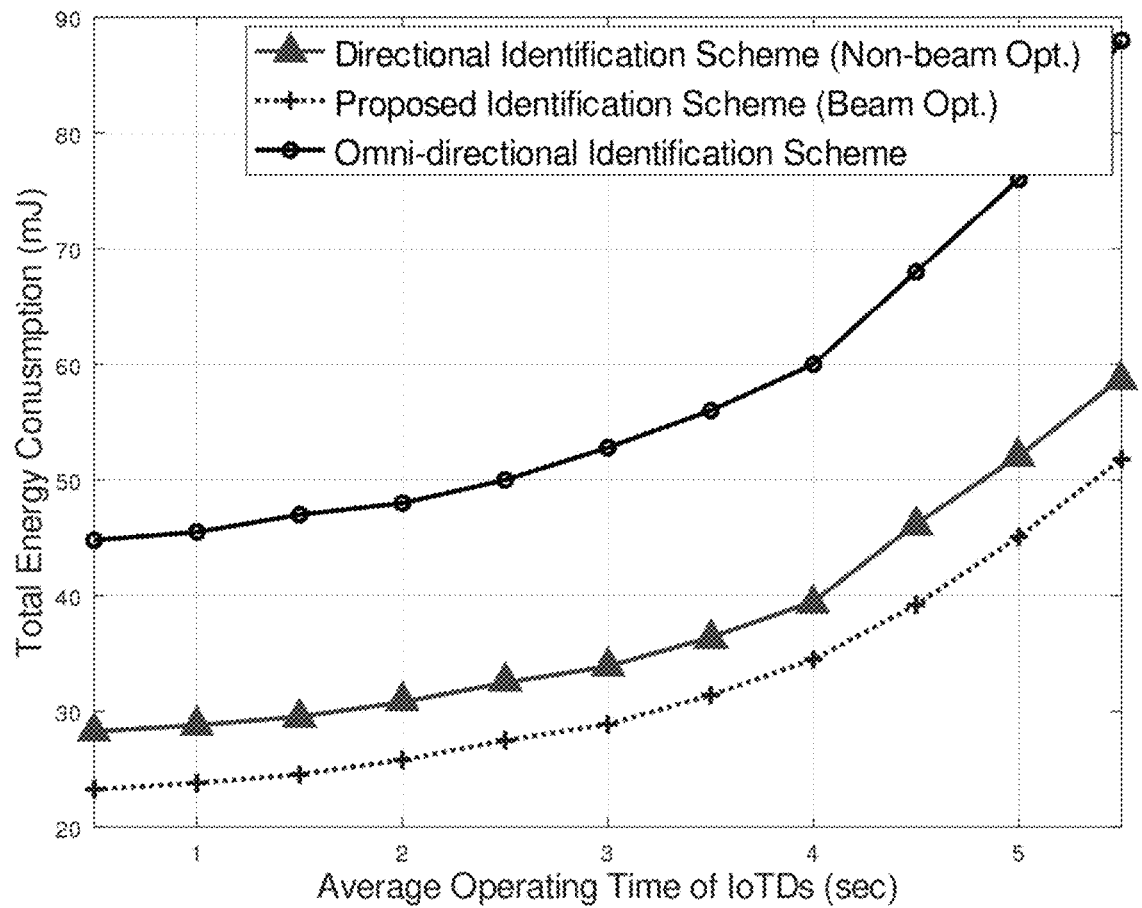
FIG. 5 is a graph illustrating a comparison of simulation results of energy consumption versus average operating time of IoTDs between the RL-based spatial resource identification system according to the embodiment of the present invention and a conventional spatial resource identification system.

FIG. 5 is a graph illustrating a comparison of simulation results of energy consumption versus average operating time of IoTDs between the RL-based spatial resource identification system according to the embodiment of the present invention and a conventional spatial resource identification system.

Referring to FIG. 5, it can be seen that energy consumption increases as the operating time of the IoTDs increases since the IoTDs perform spectrum identification more frequently in both the embodiment of the present invention and the conventional technology. In particular, it is observed that the omnidirectional identification technique consumes more energy for identification than the directional identification technique. A reason therefor is that an identification range in the omnidirectional identification technique is smaller than that in the directional identification scheme. This means that the omnidirectional identification scheme requires more energy in order to increase a sensing range comparing to the directional identification scheme. In addition, it can be confirmed that the RL-based spectrum identification technique shows an approximately 18% performance improvement over that of the conventional directional identification scheme. A reason therefor is that identification work in the conventional directional identification scheme is performed by specific IoTDs, whereas the identification work is uniformly distributed in the embodiment of the present invention.

According to the system and method for identifying a spatial resource for the IoT network, by applying machine learning, in particular, RL, the IoTD is allowed to identify an unused empty spectral space with less energy, thereby improving overall network resource efficiency. In this way, there is an excellent effect in that performance improvement may be attempted.

An embodiment of the present invention provides a technique for performing optimal communication between IoT devices 10 and 11 through spatial resource identification when the radio resource harvesting edge 20 is unable to operate due to a power cut or external attack.

Figure 6:
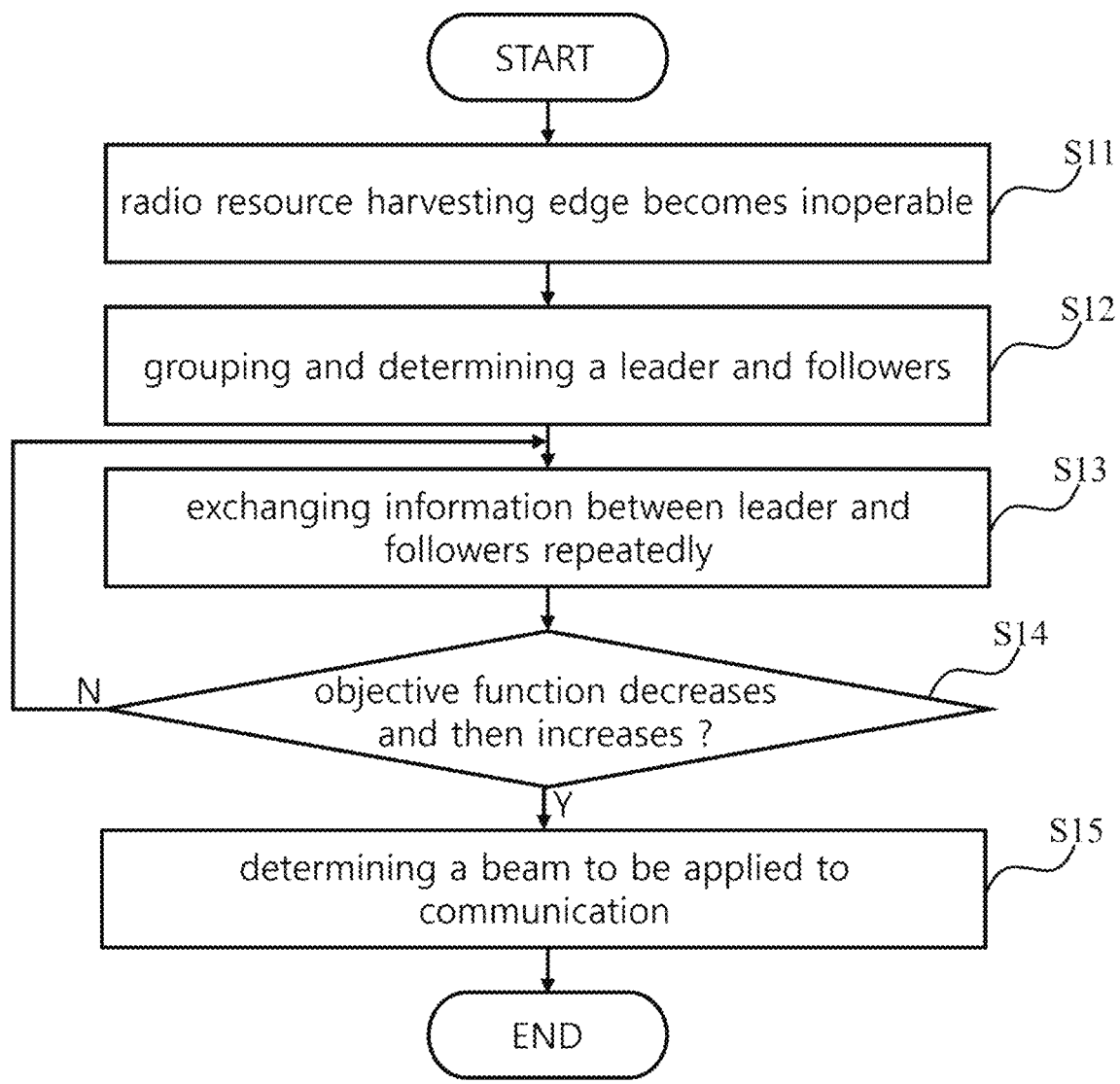
FIG. 6 is a flowchart showing an optimal communication performance technique when a radio resource harvesting edge is inoperable according to an embodiment of the present invention.

FIG. 6 is a flowchart showing an optimal communication performance technique when a radio resource harvesting edge is inoperable according to an embodiment of the present invention.

First, when the operation of the radio resource harvesting edge becomes inoperable S11, the IoTDs 10 and 11 broadcast information about their own location using LoRa (Long Range) S12.

IoTDs 10 and 11 may perform grouping and determine a leader within the group based on this location information S12. This grouping and leader decision can be performed through a preset algorithm based on the exchanged location information.

Subsequently, within each group, wireless resource allocation can be performed by repeated information exchange between the leader IoTD (hereinafter referred to as 'leader') and the remaining IoTDs (hereinafter referred to as 'followers') S13.

In step S13, the follower may apply a preset algorithm to perform a beam selection strategy that can maximize the sensing probability with minimal sensing power. The followers may perform this strategy using information about the optimal beam, which is a control variable received from the leader, and transmits information about the beam and information about the beam's sensing power threshold to the leader.

The reader may apply a strategy to prevent overlap between sensed beams by applying a preset algorithm. The leader can use the information received from the followers to create control variables corresponding to information about the optimal beam that can prevent overlap between beams and transmit them to each follower.

Next, the follower and the leader repeatedly exchange information generated by performing the strategies as described above, and the leader terminates the repetition when it reaches an inflection point where the preset objective function calculated through the received information decreases and then increases S14. The beam with information received at the termination time can be determined as the beam to be applied to communication, and the remaining beams can be turned off S15.

The technique shown in FIG. 6 is based on Stackelberg game theory and achieves radio resource allocation by finding the Stackelberg Nash equilibrium (SNE) point and selecting the optimal beam.

Effects obtainable in the present invention are not limited to the effects mentioned above, and other effects not mentioned herein may be clearly understood by those skilled in the art from the above description.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A system for identifying a spatial resource for an Internet of Things (IoT) network, the system comprising:

a plurality of IoTDs (IoT devices) configured to identify an empty spatial resource using an identification parameter and provide spectrum identification information corresponding to a result thereof; and a radio resource harvesting edge (RRHE) configured to receive the spectrum identification information, optimize the identification parameter based on the received spectrum identification information, and provide the optimized identification parameter to the IoTDs.

2. The system according to claim 1, wherein each of the IoTDs performs device-to-device (D2D) communication with another IoTD using the empty spatial resource.

3. The system according to claim 1, wherein each of the IoTDs detects surrounding IoTDs using an energy detection method based on a signal-to-noise ratio (SNR) of a received signal.

4. The system according to claim 1, wherein the RRHE is a learning agent configured to perform a reinforcement learning (RL) algorithm to optimize the identification parameter.

5. The system according to claim 4, wherein a state of the RL algorithm is a beam set including beams of the IoTDs, and an action of the RL algorithm is a subset of the beam set including selected beams among the beams of the IoTDs.

6. The system according to claim 5, wherein a reward of the RL algorithm is defined as a probability of finding a spectrum resource for energy consumed in identifying the IoTDs.

7. The system according to claim 4, wherein the RRHE applies an $\epsilon$-greedy algorithm for an action of the RL algorithm.

8. The system according to claim 4, wherein the RRHE collects the spectrum identification information from the IoTDs, performs the RL algorithm to calculate a reward for determination of an optimal beam set, shares an identification parameter derived based on previously collected spectrum identification information and a previously derived identification parameter with the IoTDs, and retrains and finds an optimal identification parameter based on a result reported from the IoTDs.

9. The system according to claim 1, wherein, when the operation of the radio resource harvesting edge becomes inoperable, the IoTDs broadcast information about their own location, the IoTDs perform grouping and determine a leader and followers within the group based on the location information, the followers apply a preset algorithm to perform a beam selection strategy that maximizes a sensing probability with minimal sensing power and perform this strategy using information about the optimal beam, which is a control variable received from the leader, and transmit information about the beam and information about the beam's sensing power threshold to the leader, the reader applies a strategy to prevent overlap between sensed beams by applying a preset algorithm and use the information received from the followers to create control variables corresponding to information about the optimal beam that prevents overlap between beams and transmit them to each follower, the follower and the leader repeatedly exchange information generated by performing the strategies, the leader terminates the repetition when it reaches an inflection point where the preset objective function calculated through the received information decreases and then increases, the beam with information received at the termination time is determined as the beam to be applied to communication, and the remaining beams are turned off.

10. A method of identifying a spatial resource for an IoT network, the method comprising:
   an identification phase of finding, by each of a plurality of IoTDs, an unused spatial resource using an identification parameter provided by an RRHE, and finding, by the RRHE, the optimal identification parameter through RL;
   a report phase of sending, by the plurality of IoTDs, an identification result to the RRHE through a control channel, and receiving, by the RRHE, the identification result and sending the identification parameter found through previous RL in the identification phase to the IoTDs; and
   a communication phase of performing, by the plurality of IoTDs, D2D communication through surrounding unused spectrum resources, updating, by the RRHE, the identification result received in the report phase, and starting, by the RRHE, to find an identification parameter using RL.

11. The method according to claim 10, further comprising:
   broadcasting, by the IoTDs, information about their own location, when the operation of the radio resource harvesting edge becomes inoperable;
   performing, by the IoTDs, grouping and determine a leader and followers within the group based on the location information,
   applying, by the followers, a preset algorithm to perform a beam selection strategy that maximizes a sensing probability with minimal sensing power and perform this strategy using information about the optimal beam, which is a control variable received from the leader, and transmit information about the beam and information about the beam's sensing power threshold to the leader,
   applying, by the reader, a strategy to prevent overlap between sensed beams by applying a preset algorithm and use the information received from the followers to create control variables corresponding to information about the optimal beam that prevents overlap between beams and transmit them to each follower,
   repeatedly exchanging, by the follower and the leader, information generated by performing the strategies,
   terminating, by the leader, the repetition when it reaches an inflection point where the preset objective function calculated through the received information decreases and then increases, and
   determining, by the leader, the beam with information received at the termination time as the beam to be applied to communication, and the remaining beams are turned off.

* * * * *